No. 698,686. Patented Apr. 29, 1902.
T. DUNCAN.
ELECTRICAL MEASURING INSTRUMENT.
(Application filed Jan. 2, 1900. Renewed Dec. 16, 1901.)
(No Model.) 2 Sheets—Sheet 2.
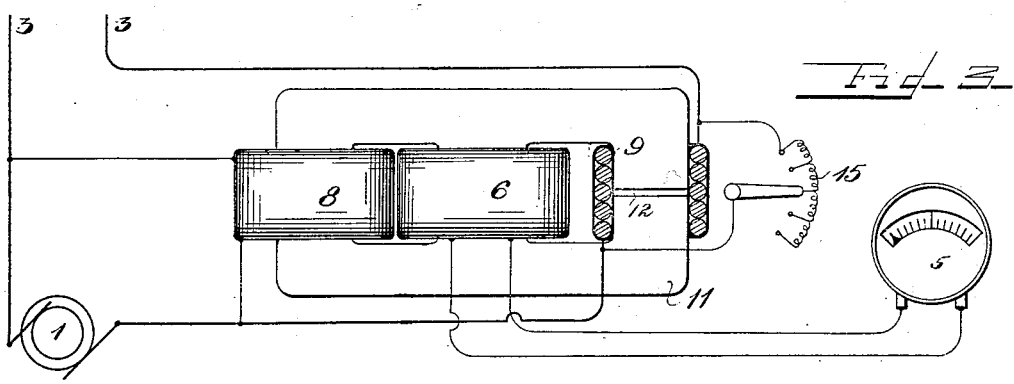
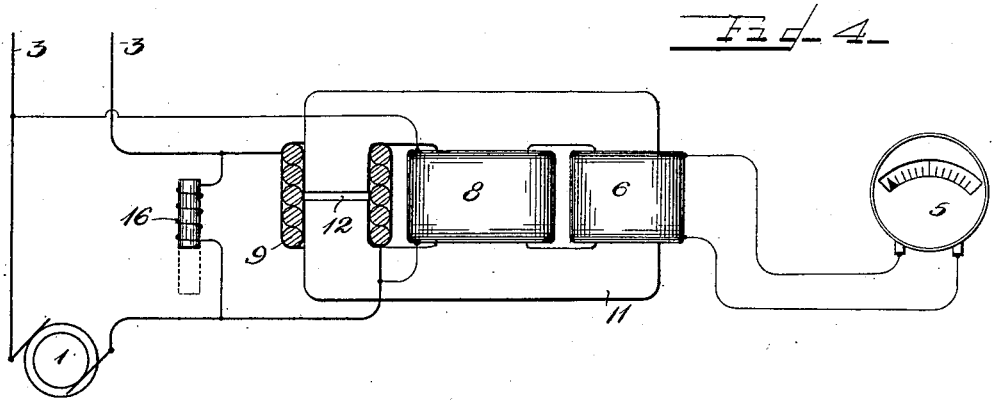
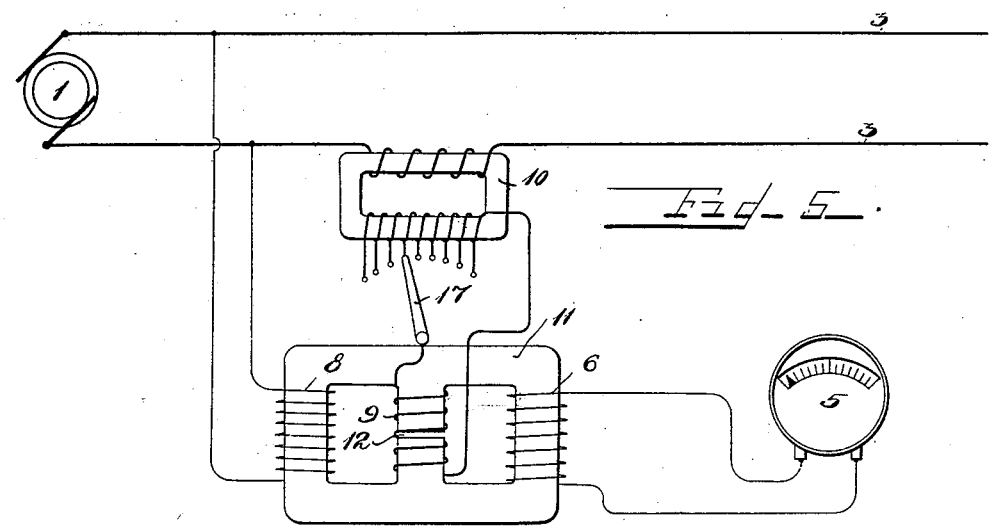
Witnesses
Inventor
Thomas Duncan
By Charles A. Brown & Cragg
Attorneys

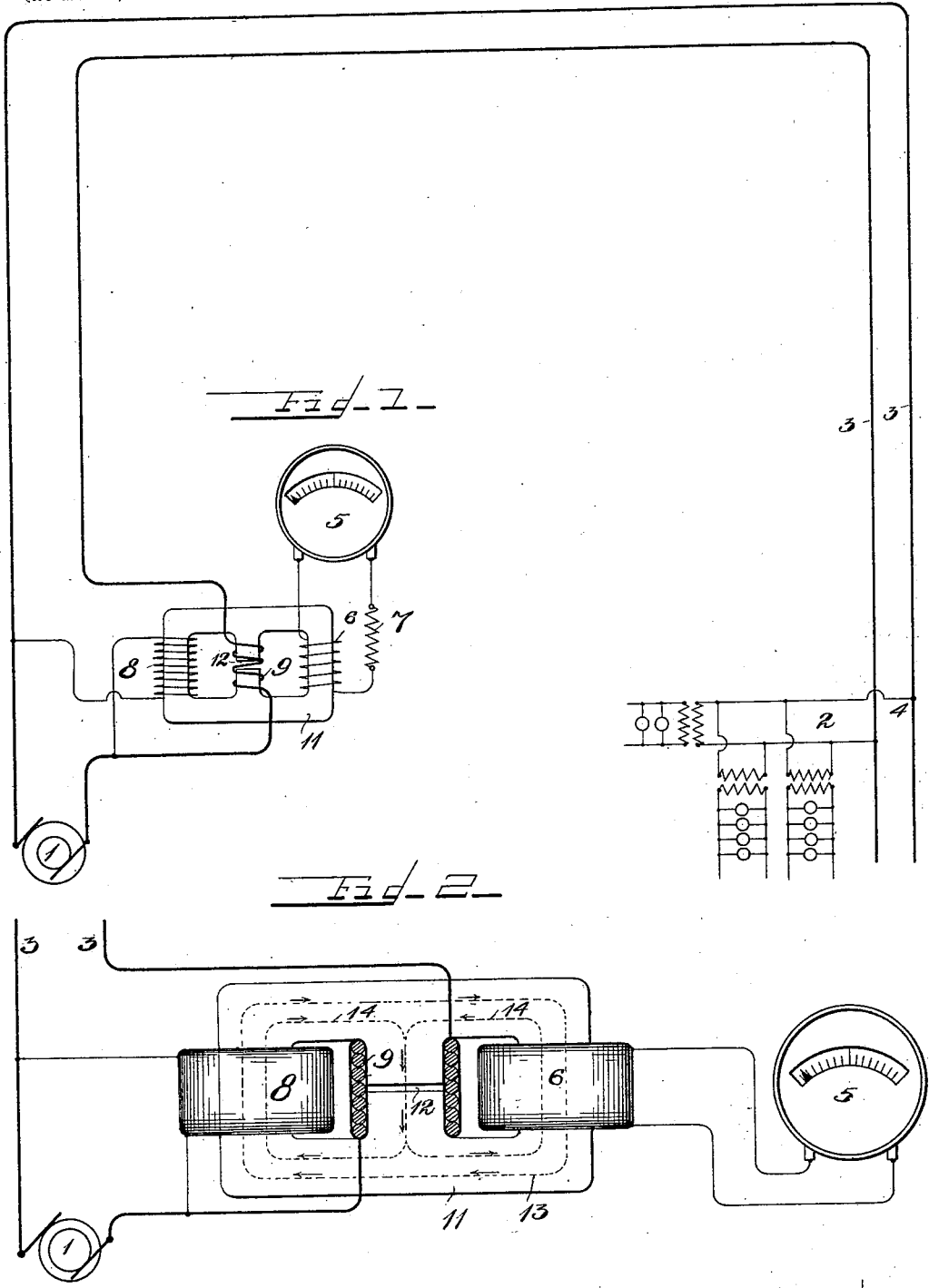

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ELECTRICAL MEASURING INSTRUMENT.

SPECIFICATION forming part of Letters Patent No. 698,686, dated April 29, 1902.

Application filed January 2, 1900. Renewed December 16, 1901. Serial No. 86,063. (No model.)

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, (Case No. 352,) of which the following is a full, clear, concise, and exact description, reference being had to the accompanying drawings, forming a part of this specification.

My invention relates to systems of alternating-current distribution, and has for its object the provision of an improved form of compensating volt-measuring apparatus which is simple in construction and circuit arrangement and which will effectively compensate for the drop in pressure between the generating plant or station and a distant point of the distribution-circuit—as, for example, the center of distribution.

As is well known to those skilled in the art, there is a drop in pressure at any point of the distribution-circuit distant from the generator, known as the "C R" drop and which varies from time to time with the load.

By means of my invention I am enabled to produce a simple measuring apparatus which will vary its reading to correspond with the variation in the C R drop, whereby the pressure may be accurately determined at the distant point of distribution.

Heretofore a method of measuring the pressure at distant points of distribution consisted in employing two transformers, the primaries of which were respectively connected in series and in bridge of the distributing-conductors, while the secondaries of the transformers were included in series with the voltmeter. By means of my present invention I am enabled to employ a single secondary winding common to two primary windings, one of the latter windings being in series with a distribution-conductor, while the other is in bridge between the distribution-conductors. The instrument is included in circuit with the single secondary winding. Where desired, the primary windings of the transformers, instead of being metallically included in circuit with the distributing-conductors, may receive their current in other ways well known to those skilled in the art.

I have employed a transformer primary winding in circuit with the secondary of another transformer whose primary is included in series with a distributing-conductor.

I will explain my invention more fully by reference to the accompanying drawings, illustrating the preferred embodiment thereof, in which—

Figure 1 illustrates a system of alternating-current distribution, showing one form of apparatus constructed and arranged in accordance with the invention. Fig. 2 is a detailed view illustrating the magnetic principles involved in the instrument shown in Fig. 1. Figs. 3, 4, and 5 illustrate other embodiments of the invention.

Like parts are indicated by similar characters of reference throughout the different figures.

I have illustrated an alternating-current generator 1, supplying current to translating devices 2, which receive current from distributing-conductors 3 3 at the distant point or center of distribution 4, the pressure at which point it is desired to determine. A voltmeter 5 of any well-known construction is indicated, being included in circuit with a single secondary winding 6, a resistance 7 being included in series with [the voltmeter-winding and the said secondary winding to prevent undue flow of current through the meter. I have illustrated two primary windings 8 and 9, the first being interposed between the sides of the distribution-circuit, preferably by being metallically connected therewith, while the second creates a field proportional to the current flowing over the system, the second primary winding being either included in metallic circuit and in series with one of the distributing-conductors, as illustrated in Fig. 1, or in circuit with the secondary winding of a transformer 10, whose primary is included in series with one of the transmission-conductors, as illustrated in Fig. 5.

I preferably employ a three-legged transformer-core 11, affording three magnetic circuits for the lines of force created by the windings of the transformer, the core being provided with parallel base portions of magnetic material which serve to unite the legs of the transformer into closed magnetic circuits.

In Figs. 1, 2, and 5 I have illustrated the primary series or current winding of the transformer about the middle leg of the transformer-core, while in Figs. 3 and 4 I have shown the series or current primary winding upon the right and left legs, respectively, of the transformer-core. When there is no load on the generator, there will of course be no current through the series winding 9, and the magnetism set up by the primary winding 8, therefore, will set up a secondary electromotive force in the secondary 6, proportional to the impressed pressure, this electromotive force being indicated by the voltmeter. It will be observed that the leg of the transformer about which the current-winding is disposed, is formed in two separated parts, a gap 12 intervening between the portions of the leg to increase the reluctance of this portion of the transformer-circuit, whereby practically all of the magnetism generated by the primary winding 8 will pass through the secondary coil 6 when there is no load, as indicated by the line 13 in Fig. 2. As load is put upon the system the current through the current-winding 9 sets up a magnetomotive force in the same direction as the magnetomotive force of the winding 8 and draws a portion of the magnetism due to the said winding down through its own core portion across the air-gap 12, thereby diverting a portion of the magnetic flux from the secondary winding 6 and reducing the electromotive force in the said secondary winding. The paths of the magnetic flux due to the current-winding are indicated by the lines 14 14. It will be observed that the direction of the flux due to the current-winding through the portion of the transformer-core immediately surrounded by the secondary winding is opposed to the direction of flow of lines of force in this part of the transformer-core due to the primary winding 8. When the apparatus is properly adjusted for the required percentage of drop, the voltmeter 5 will correctly indicate under all conditions the pressure at the point 4. As the load increases this action continues, and the winding 9 can be so proportioned as to cause the voltmeter to indicate any percentage of drop for different currents and for any given maximum load.

In Fig. 3 I have indicated an adjusting variable resistance 15 in shunt of the current-winding for determining the amount of current traversing the said winding.

In Fig. 4 I have shown adjustable inductance 16 in shunt of the current-winding.

In Fig. 5 I have shown a switch 17, adapted to vary the number of turns of the secondary of the transformer 10 included in circuit with the current-winding 9 to assist in getting any percentage of regulation or compensation with any load as a maximum within the capacity of the transformer 10.

It is obvious that changes may readily be made in the embodiment of my invention herein shown and particularly described, and I do not, therefore, wish to be limited to the precise apparatus disclosed; but,

Having thus described my invention, I claim as new and desire to secure by Letters Patent—

1. In an alternating-current system of electrical distribution, the combination with an alternating-current generator supplying a distribution-circuit, of a pressure-winding interposed between the sides of the circuit, a current-winding, a third winding in inductive relation with the two aforesaid windings, the current-winding serving to divert lines of force due to the pressure-winding from the said third winding into a path parallel with the main path of the pressure lines of force and a voltmeter supplied with current from the said third winding, substantially as described.

2. In a system of alternating-current distribution, the combination with an alternating-current generator supplying a distribution-circuit, of a transformer having three windings, one a pressure-winding interposed between the generator-terminals, the second a current-winding, and the third constituting the secondary of the transformer, the current-winding serving to divert lines of force due to the pressure-winding from the said third winding into a path parallel with the main path of the pressure lines of force and a voltmeter receiving current from the secondary winding, substantially as described.

3. In a system of electrical distribution, the combination with an alternating-current generator supplying a distribution-circuit, of a transformer having three windings and a three-legged core, each of the legs of the core having one of the windings disposed about the same, one of the said windings being a pressure-winding interposed between the sides of the distribution-circuit, the second a current-winding, and the third the secondary of the transformer, and a voltmeter receiving current from the secondary of the transformer, substantially as described.

4. In a system of alternating-current distribution, the combination with an alternating-current generator supplying a distribution-circuit, of a transformer having three windings and a three-legged core, each of the legs of the core having one of the windings disposed about the same, one of the said windings being a pressure-winding interposed between the sides of the distribution-circuit, the second a current-winding and the third the secondary of the transformer, the leg of the transformer about which the current-winding is disposed having reluctance to prevent too great a flow of lines of force due to the pressure-winding through this portion of the transformer-core, and a voltmeter receiving current from the secondary of the transformer, substantially as described.

5. In an alternating-current system of electrical distribution, the combination with an alternating-current generator supplying a distribution-circuit, of a pressure-winding interposed between the sides of the circuit, a current-winding, a third winding in inductive relation with the pressure-winding, the current-winding serving to divert lines of force due to the pressure-winding from the said third winding into a path parallel with the main path of the pressure lines of force, and a voltmeter supplied with current from the said third winding, substantially as described.

6. In a system of alternating-current distribution, the combination with an alternating-current generator supplying a distribution-circuit, of a transformer having three windings and a three-legged core, each of the legs of the core having one of the windings disposed about the same, one of the said windings being a pressure-winding interposed between the sides of the distribution-circuit, the second a current-winding and the third the secondary of the transformer, the leg of the transformer about which the current-winding is disposed having an air-gap extending transversely through the same to prevent too great a flow of lines of force due to the pressure-winding through this portion of the transformer-core, and a voltmeter receiving current from the secondary of the transformer, substantially as described.

In witness whereof I hereunto subscribe my name this 22d day of December, A. D. 1899.

THOMAS DUNCAN.

Witnesses:
WILLIAM F. MEYER,
JAMES W. DALTON.